US009160640B1

(12) United States Patent
Carlson et al.

(10) Patent No.: US 9,160,640 B1
(45) Date of Patent: *Oct. 13, 2015

(54) COLLECTING CLIENT-SIDE PERFORMANCE METRICS AND LATENCIES

(71) Applicant: IMDB.COM, INC., Seattle, WA (US)

(72) Inventors: Adam Carlson, Seattle, WA (US); Olia Kerzhner, Seattle, WA (US); Joseph C. Lee, Seattle, WA (US); Andrew C. Berg, Bothell, WA (US)

(73) Assignee: IMDB.COM, INC., Seattle, WA (US)

( * ) Notice: Subject to any disclaimer, the term of this patent is extended or adjusted under 35 U.S.C. 154(b) by 278 days.

This patent is subject to a terminal disclaimer.

(21) Appl. No.: 13/838,940

(22) Filed: Mar. 15, 2013

Related U.S. Application Data

(63) Continuation of application No. 13/608,410, filed on Sep. 10, 2012, now Pat. No. 8,433,750, which is a continuation of application No. 12/765,178, filed on Apr. 22, 2010, now Pat. No. 8,266,281.

(51) Int. Cl.
H04L 12/26 (2006.01)

(52) U.S. Cl.
CPC ................................. H04L 43/0876 (2013.01)

(58) Field of Classification Search
USPC ........... 707/609; 715/235; 719/318; 709/203, 709/217, 219, 223, 224
See application file for complete search history.

(56) References Cited

U.S. PATENT DOCUMENTS

| | | |
|---|---|---|
| 6,401,096 B1 | 6/2002 | Zellweger |
| 6,438,592 B1 | 8/2002 | Killian |
| 7,873,715 B1 | 1/2011 | Haber |
| 8,255,358 B2 * | 8/2012 | Ballew et al. ................. 707/609 |
| 2003/0154177 A1 | 8/2003 | Holland et al. |
| 2006/0085420 A1 | 4/2006 | Hwang |
| 2007/0061488 A1 | 3/2007 | Alagappan et al. |
| 2007/0271375 A1 | 11/2007 | Hwang |
| 2010/0122270 A1 * | 5/2010 | Lin ............................ 719/318 |
| 2010/0153544 A1 | 6/2010 | Krassner et al. |
| 2010/0235762 A1 | 9/2010 | Laiho et al. |
| 2011/0173529 A1 * | 7/2011 | Wagner ........................ 715/235 |

OTHER PUBLICATIONS

U.S. Notice of Allowance/Allowability dated May 7, 2012 in U.S. Appl. No. 12/765,178.
U.S. Notice of Allowance/Allowability dated Sep. 10, 2012 in U.S. Appl. No. 13/608,410.

* cited by examiner

Primary Examiner — Quang N Nguyen
(74) Attorney, Agent, or Firm — Lee & Hayes, PLLC

(57) ABSTRACT

Technologies are described herein for collecting client-side performance metrics and latencies. A web page received by a web browser application executing on a user computing device includes markup or scripting code that instructs the browser to collect performance measures during the rendering of the content of the web page. The performance measures may include operation timings that measure the time it takes for a particular operation to complete during the rendering of the content and/or event counters that count the number of times that a specific event occurs during the rendering of the content. The web browser application sends an event report containing the collected performance measures to a reporting module executing on a server computer. The reporting module receives the event report, validates the content of the event report, and adds the event report to a database or other data storage system.

27 Claims, 5 Drawing Sheets

COLLECTING CLIENT-SIDE PERFORMANCE METRICS AND LATENCIES

CROSS-REFERENCE TO RELATED APPLICATIONS

This application is a continuation of prior U.S. patent application Ser. No. 13/608,410, now U.S. Pat. No. 8,433,750 (issued Apr. 30, 2013), entitled "COLLECTING CLIENT-SIDE PERFORMANCE METRICS AND LATENCIES" and filed Sep. 10, 2012, which is a continuation of prior U.S. patent application Ser. No. 12/765,178, now U.S. Pat. No. 8,266,281 (issued Sep. 11, 2012), entitled "COLLECTING CLIENT-SIDE PERFORMANCE METRICS AND LATENCIES" and filed Apr. 22, 2010, both of which are expressly incorporated herein by reference in their entirety.

BACKGROUND

A content provider may provide content in web pages or other files to user computing devices across the Internet. These web pages may also contain web-based advertisements ("ads") or other external content that are sourced from third-party services and rendered at the user computing device along with the content in the web page. Furthermore, these web pages may also contain images or other external content that are sourced from the content provider separately from the web page itself, and rendered at the user computing device along with the content in the web page. The content provider may have the ability to measure server-side latencies and other performance metrics involved with serving the web pages to the user computing devices and responding to other requests for content or data on the content provider's servers. These latencies and performance metrics may be collected and stored in a data storage system, allowing the content provider to monitor the performance of its servers and produce performance reports regarding the serving of the web pages or other data. However, the content provider may not have the ability to measure client-side latencies or other performance metrics involved in delivering and rendering the content at the user computing device.

It is with respect to these and other considerations that the disclosure made herein is presented.

DETAILED DESCRIPTION

The following detailed description is directed to technologies for collecting client-side performance metrics and latencies. Utilizing the technologies described herein, a content provider receives performance measures collected by browser applications during the rendering of web-based content on user computing devices. Such client-side performance measures may include the time it takes to render a portion of markup in a web page, the duration of execution of a critical section of code, the time involved in calling third-party services to retrieve web-based ads or external content, and the occurrence of specific events during rendering of the content. The content provider may aggregate and store these client-side performance measures in a database, and utilize the database to provide performance monitoring and reporting regarding the client-side rendering of its web-based content. These and other advantages and features will become apparent from a reading of the following disclosure and a review of the associated drawings.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
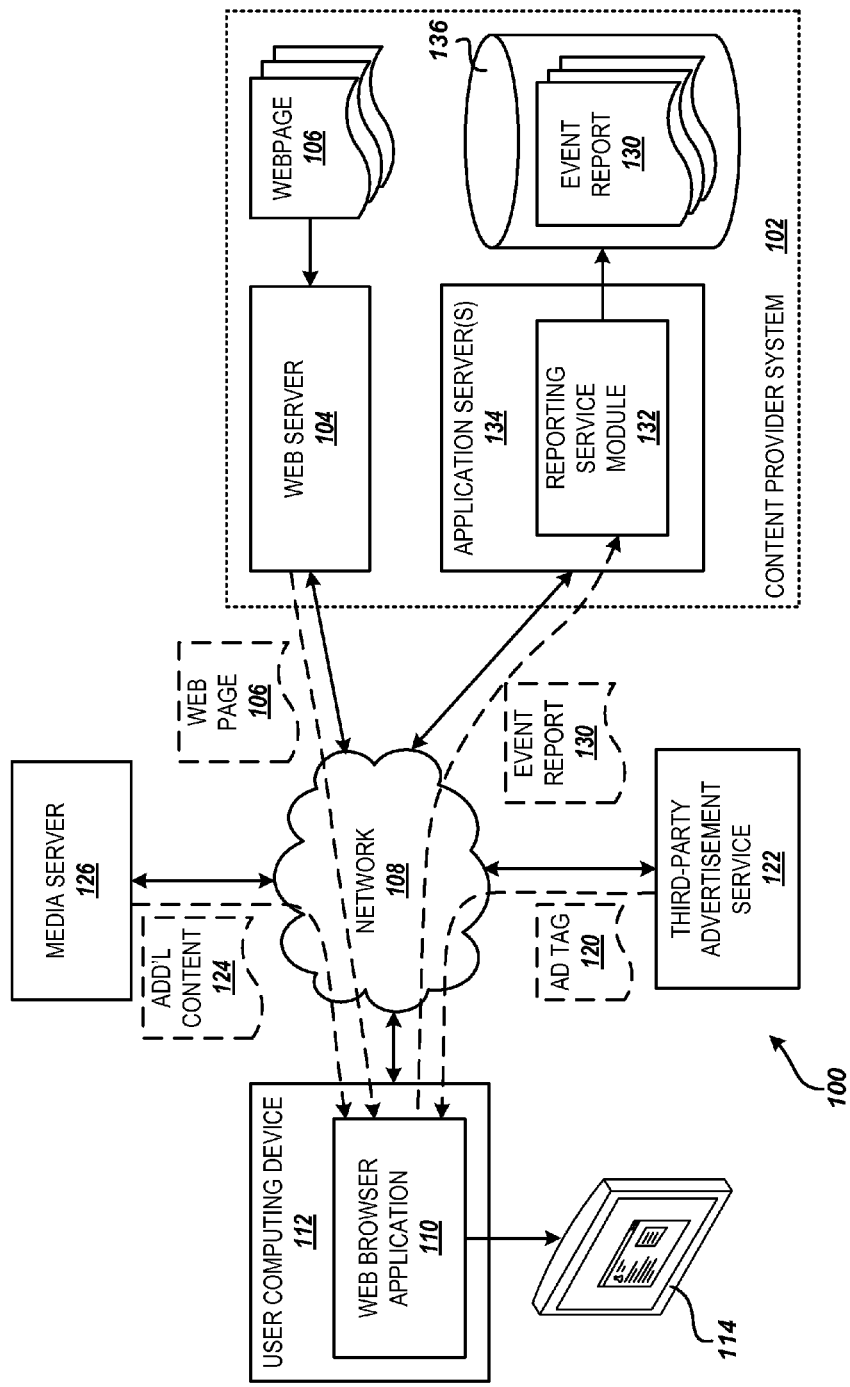
FIG. 1 is a system and network diagram showing aspects of an illustrative operating environment for collecting client-side performance metrics and latencies, including several software and hardware components provided by embodiments presented herein.

FIG. 1 and the following description are intended to provide a brief, general description of a suitable computing environment in which the embodiments described herein may be implemented. In particular, FIG. 1 is a system and network diagram that shows an illustrative operating environment 100 including several software components for collecting client-side performance metrics and latencies, according to embodiments provided herein. The environment 100 comprises a content provider system 102 that includes a web server 104. The web server 104 may be one of any number of web server applications known in the art running on one or more server computers.

According to embodiments, the web server 104 serves web pages 106 across a network 108 to a web browser application 110 executing on a user computing device 112. The web pages 106 may be documents, files, or other data structures containing hypertext markup language ("HTML"), extensible markup language ("XML"), JavaScript code, and other markup and/or scripting code that instruct the web browser application 110 how to render the contents of the web page on a display 114 attached to the user computing device 112. The network 108 may represent one or more of a local-area network ("LAN"), a wide-area network ("WAN"), the Internet, or any other networking topology known in the art that connects the user computing device 112 to the web server 104 and other computer systems in the operating environment 100, as will be described below.

The user computing device 112 may be a personal computer ("PC"), a desktop workstation, a laptop, a notebook, a wireless telephone, a personal digital assistant ("PDA"), an e-reader, a game console, a set-top box, a consumer electronics device, a server computer, and the like. The web browser application 110 may be the INTERNET EXPLORER® internet browser from MICROSOFT Corporation of Redmond, Wash., the FIREFOX® web browser from MOZILLA Corporation of Mountain View, Calif., or any other web browser application known in the art. While the operating environment 100 illustrated in FIG. 1 includes a web browser application 110 communicating with a web server 104, it will be appreciated that the embodiments described herein may be utilized with any number of client applications known in the art that access and retrieve web pages and/or other content from a remote server computer across the network 108. It is intended that all such client application programs and remote server computers be included in the scope of this application.

According to one embodiment, the web page 106 contains markup and/or scripting code that instructs the web browser application 110 to retrieve an advertisement ("ad") tag 120 regarding possible advertisements to include in rendering the web page. The ad tag 120 may be retrieved from a third-party advertisement service 122 located across the network 108, such as DOUBLECLICK® from GOOGLE, INC. of Menlo Park, Calif. The ad tag 120 may contain instructions and/or a location regarding an advertisement to be included with the content of the web page 106 rendered at the user computing device 112.

The web page 106 may also contain markup or scripting code that instructs the web browser application 110 to retrieve and render additional content 124 from an external source. The additional content 124 may include text; graphic images, such as logos, product images, photographs, maps, or advertisement graphics; multi-media content, such as audio and/or video; and the like. The web browser application 110 may retrieve the additional content 124 from an external host, such as the media server 126 shown in FIG. 1, across the network 108.

The web page 106 sent to the user computing device 112 by the web server 104 further contains markup and/or scripting code that instruct the web browser application 110 to collect operation timings, event counters, and other performance measures that occur during the rendering of the web page, according to the embodiments described herein. As will be described in more detail below in regard to FIG. 2, operation timings may measure the time it takes the web browser application 110 to perform a specific operation, such as rendering a portion of markup, executing a critical section of scripting code, calling an external service to retrieve additional content across the network 108, and the like. Event counters may be utilized to count the occurrence specific events during the rendering of the web page, for example.

The web browser application 110 may transmit an event report 130 containing the collected operation timings, event counters, and other performance measures to a reporting service module 132 in the content provider system 102. The reporting service module 132 may execute on a single application server 134 or in parallel across multiple application servers in the content provider system 102. In addition, the reporting service module 132 may consist of a number of subcomponents executing on different application servers 134 or other computing devices in the content provider system 102. The reporting service module 132 may be implemented as software, hardware, or any combination of the two. As will be described in more detail below in regard to FIG. 4, the reporting service module 132 may receive and validate the event report 130, and then store the event report in a database 136 or other data storage system in the content provider system 102.

The database 136 may provide the event reports 130 contained therein to performance monitoring and reporting systems in the content provider system 102, in order to support performance monitoring and other desired administrative functions. In one embodiment, the event reports 130 in the database 136 are aggregated and the performance measures contained therein summarized by any combination of specific operation or event, type of operation or events, type of web page, time of day, geographic location of the user computing device 112, and the like. In another embodiment, the aggregated performance measures from the event reports 130 may be utilized to generate alerts upon occurrence of abnormal situations that may indicate a performance problem, such as the number of specific events occurring within a set period of time exceeding a threshold value, individual or aggregated durations of a specific operation exceeding a threshold value, and the like. The threshold values for event counts and operation durations may be set by administrators of the content provider system 102 and may be based on experimentation and/or periodic sampling of the event reports 130 contained in the database 136.

Figure 2:
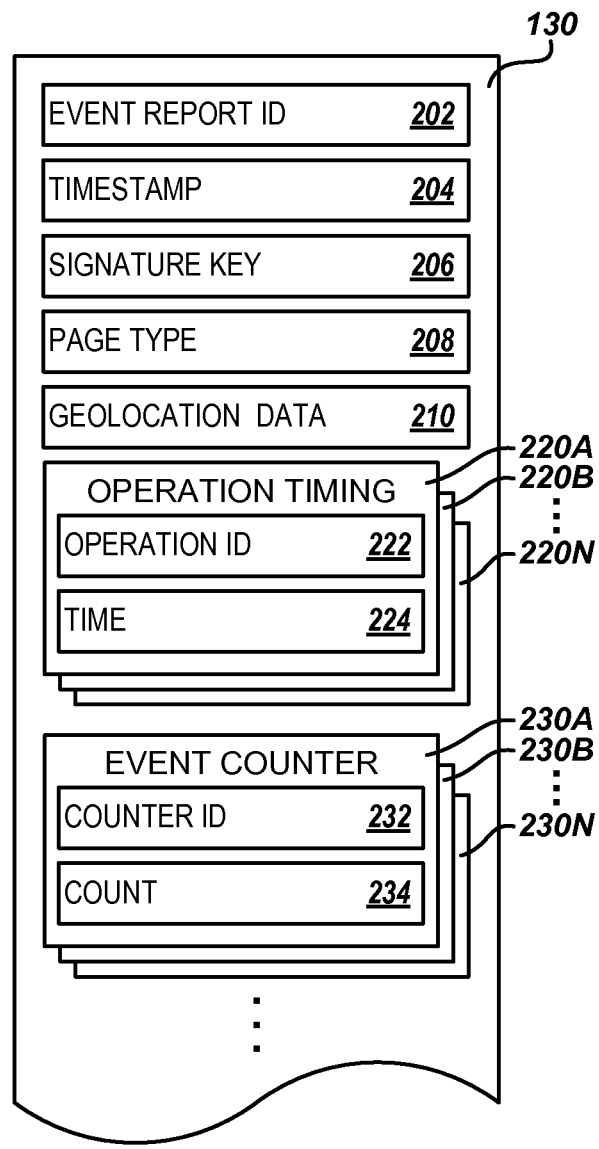
FIG. 2 is a data structure diagram illustrating a number of data elements stored in an event report, according to embodiments presented herein.

Turning now to FIG. 2, one or more data structures containing a number of data elements will be described. It will be appreciated by one skilled in the art that the data structures shown in the figures may represent rows in a database table, objects stored in a computer memory, programmatic structures, or any other data containers commonly known in the art. Each data element included in the data structures may represent one or more fields or columns of a database row, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

In particular, FIG. 2 shows one example of data elements that may be stored in the event report 130, according to embodiments. As described above, the event report 130 contains data regarding operation timings, event counters, and other performance measures collected by the web browser application 110 executing on the user computing device 112 during the rendering of the contents of the web page 106 to the connected display 114. The event report 130 may contain an event report ID 202. The event report ID 202 may be a globally-unique identifier ("GUID") 202 that uniquely identifies the event report data associated with a particular rendering of the web page 106 by the web browser application 110 on the user computing device 112.

According to one embodiment, the markup and/or scripting code embedded in the web page 106 may instruct the web browser application 110 to send multiple event reports 130 during the rendering of the web page. A single event report ID 202 may be embedded in the web page 106 by the web server 104 before the web page is sent to the user computing device 112. In this way, each event report 130 generated by the web browser application 110 during the rendering of the web page 106 will contain the same event report ID 202, allowing all of the operation timings, event counters and other performance measures contained in the multiple event reports to be associated with the particular rendering of the web page at the user computing device 112.

The event report 130 may also contain a timestamp 204. The timestamp 204 may indicate the approximate date and time that the web page 106 is rendered by the web browser application 110 on the user computing device 112. In one embodiment, the timestamp 204 is generated by the web server 104 and embedded in the web page 106 before the web page is sent to the user computing device 112. In other embodiments, the timestamp 204 may be generated by the web browser application 110. For example, the timestamp 204 may be generated at the time the web browser application 110 begins rendering the web page 106, or it may be generated at the time each event report 130 is sent to the reporting service module 132.

According to one embodiment, the event report 130 also contains a signature key 206. The signature key 206 may be a numeric key utilized by the reporting service module 132 to verify the authenticity of the event report 130. This may prevent erroneous or unauthorized event reports 130 from being accepted by the reporting service module 132. For example, the web server 104 may compute a hash-based message authentication code ("HMAC") from the timestamp 204 and a secret code. The web server 104 may embed the HMAC and the timestamp 204 in the web page 106 before the web page is sent to the user computing device 112. The web browser application 110 may then include the timestamp 204 and the signature key 206 containing the HMAC in each event report 130 sent to the reporting service model 132 during rendering of the web page 106. As will be described below in regard to FIG. 4, the reporting service module 132 may utilize the values of the timestamp 204 and the signature key 206 to authenticate the event reports 130.

The event report 130 may also contain a page type 208. The page type 208 may be a string or other value identifying the web page 106 being rendered by the web browser application 110. The page type 208 may be utilized by the performance monitoring and reporting systems along with the performance measures contained in the event report 130 to troubleshoot performance issues in a particular web page 106, for example. The page type 208 may be embedded in the markup and/or scripting code of the web page 106 and included in each event report 130 generated by the web browser application 110.

The event report 130 may further contain geolocation data 210 that identifies aspects of the geographic location of the user computing device 112 at which the web page 106 is rendered. For example, the geolocation data 210 may include a country code, a region code, GPS coordinates, or other data from which the location of the user computing device 112 may be determined. Similar to the page type 208, the geolocation data 210 may be utilized by the performance monitoring and reporting systems to produce reports of client-side performance measures according to a particular geographic category, such as country. In one embodiment, the geolocation data 210 may be determined by the web server 104 from an IP address or other identifier of the user computing device 112 included in the request for the web page 106, for example. The geolocation data 210 may then be embedded in the markup and/or scripting code of the web page 106 sent to the user computing device 112. In another embodiment, the geolocation data 210 may be supplied by the web browser application 110 executing on the user computing device 112 and included in each event report 130 sent to the reporting service module 132.

According to embodiments, the event report 130 also contains a number of operation timings 220A-220N (referred to herein generally as operation timing 220). Each operation timing 220 represents a timing measurement collected by the web browser application 110 while rendering the web page 106 at the user computing device 112. For example, the markup and/or scripting code embedded in the web page 106 may instruct the web browser application 110 to measure the time it takes to retrieve the ad tag 120 from the third-party advertisement service 122, as described above in regard to FIG. 1. Alternatively, the web browser application 110 may measure the time it takes to retrieve additional content 124 from a media server 126 hosting the content.

In further embodiments, operation timings 220 may be collected measuring the execution time of a specific section of scripting code, the latency involved in Ajax calls or other external service calls made to retrieve additional data or content, the duration of time between the start of rendering of the web page and a first user interaction with the content, the total time required for rendering the web page 106, and the like. It will be appreciated that operation timings 220 may be collected for other operations and events beyond those described herein. Each operation timing 220 includes an operation ID 222 identifying the specific operation that was timed. The operation ID 222 may be a string or numeric identifier supplied by the markup and/or scripting code embedded in the web page 106 that instructs the web browser application 110 to time the operation, as will be described in more detail below in regard to FIG. 3. Each operation timing 220 further contains a time 224 indicating the duration of the measured operation.

The event report 130 may further contain a number of event counters 230A-230N (referred to herein generally as event counter 230). Each event counter 230 may represent a count of a specific event that occurred during the rendering of the web page 106 by the web browser application 110. For example, the markup and/or scripting code embedded in the web page 106 may instruct web browser application 110 to increment a specific event counter 230 each time the ad tag 120 is returned from the third-party advertisement service 122 containing no data, or a "null ad." Event counters 230 may also measure the number of times an Ajax call or other external service call fails or times-out.

In another example, a particular event counter 230 may be incremented at the completion of the rendering of the web page 106 by the web browser application 110, indicating that the entire web page was rendered before the user of the user computing device 112 navigated away from the page. Further, an event counter 230 may be used to measure how long a particular web page 106 remains visible in the display 114 connected to the user computing device 112. Upon receiving the web page 106, markup and/or scripting code embedded in the web page may instruct the web browser application 110 to establish a repeating timer that expires after a specific amount of time, such as 100 ms. Upon each expiration of the timer, the event counter 230 may be incremented and an event report 130 sent to the reporting service module 132. This may allow the reporting service module 132 to establish how long the user of the user computing device 112 remains on the web page 106.

It will be appreciated that event counters 230 may be collected for other operations and events beyond those described herein. Each event counter 230 includes a counter ID 232 identifying the specific event that was counted. The counter ID 232 may be a string or numeric identifier that is associated with the specific markup or scripting code incrementing the event counter, as will be described in more detail below in regard to FIG. 3. Each event counter 230 further contains a count 234 indicating the number of times that the measured event occurs during rendering of the web page 106. It will further be appreciated that the event report 130 may contain additional data elements describing other performance measures collected by the web browser application 110 while rendering the web page 106 at the user computing device, beyond those shown in FIG. 2 and described above. The event report 130 may also contain fewer or different data elements than those shown in the figure. It is intended that all such data elements contained in the event report 130 be included in this application.

Figure 3:
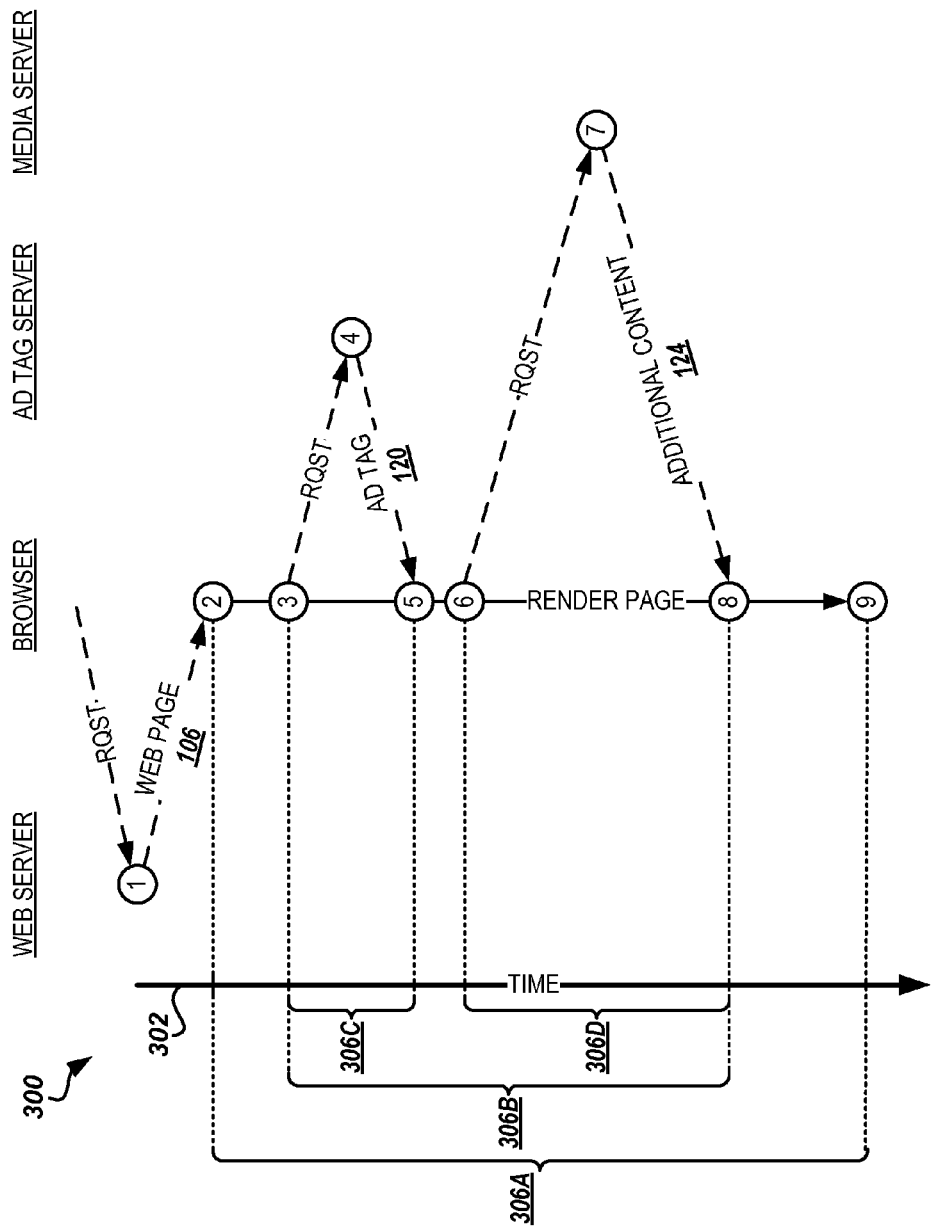
FIG. 3 is a timing diagram illustrating an exemplary sequence of operations and events that occur during the rendering of a web page, according to embodiments presented herein.

FIG. 3 shows a timing diagram illustrating an exemplary sequence 300 of operations and events that may occur during the rendering of the web page 106 by the web browser application 110, along with several operation timings 220 collected for the operations and events, according to embodiments presented herein. The sequence 300 starts at event 1, where the web server 104 sends the web page 106 to the user computing device 112. The web server 104 may send the web page 106 in response to a request for the page received from the web browser application 110, for example. According to embodiments, the web page 106 has embedded markup and/or scripting code that instruct the web browser application 110 to collect specific operation timings 220, event counters 230, and other performance measurements during rendering of the web page. In one embodiment, before sending the web page 106 to the web browser application 110, the web server 104 generates a unique event report ID 202, a timestamp 204, and a signature key 206 and embeds these values into the markup and/or scripting code of the web page to be utilized by the web browser application when sending the event reports 130 to the reporting service module 132.

At event 2, the web browser application 110 receives the web page 106 and begins to render the web page to the display 114 connected to the user computing device 112. The web page 106 may contain markup and/or scripting code that instructs the web browser application 110 to collect an operation timing 220 for a total page load time, indicated along the timeline 302 by 306A in FIG. 3. According to one embodiment, the web browser application 110 initiates collection of this operation timing 220 by utilizing an application programming interface ("API") supplied by the web server 104 with the web page 106. The API may include the following function for starting a timer to collect an operation timing 220:

start_timer(id)

where id is the operation ID 222 for the operation timing. For example, the web page 106 may contain the following JavaScript code that is executed when page rendering begins:

start_timer("page load");

This code initiates collection of the operation timing 220 for the total page load time 306A.

At event 3, the web browser application 110 may begin the operation of loading of an advertisement on the page. It will be appreciated that this operation may be performed in parallel to the primary rendering operation by the web browser application 110. The web page 106 may contain the following JavaScript code that is executed when loading of the advertisement begins:

start_timer("topcenter");

where the operation ID 222 of "top_center" identifies the particular position in the web page where the advertisement will be rendered. This code initiates collection of the operation timing 220 for the total time to load the advertisement, as indicated by 306B in FIG. 3. As described above in regard to FIG. 1, the process of loading an advertisement may begin by retrieving an ad tag 120 from the third-party advertisement service 122. This may be done through scripting code embedded in the web page 106, for example. An operation timing 220 may also be collected that measures the time of the call to the third-party advertisement service 122, as indicated by 306C, by first executing the following JavaScript code before sending the request to the third-party advertisement service:

start_timer("top_center_tag");

At event 4, the third-party advertisement service 122 receives the request for the ad tag 120 and returns the ad tag to the web browser application 110. At event 5, upon receiving the ad tag 120, the web browser application 110 may mark completion of the call to the third-party advertisement service 122 through another function in the API, such as:

end_timer (id, reportNow=false)

where id is the operation ID 222 for the corresponding operation timing 220 and reportNow is a parameter that tells the API to send an event report 130 to the reporting service module 132 immediately upon completing the current operation timing. The reportNow parameter may allow the web browser application 110 to send interim event reports 130 at critical points in the rendering of the web page 106. For example, at some point after all the content in the initially visible portion of the web page 106 has been loaded, the web browser application 110 may set the reportNow parameter in an end_timer call to true, so that all operation timings 220, event counters 230, and other performance measurements collected up to that point may be reported to the reporting service module 132 before the rendering of the web page is completed.

Returning to the sequence 300 illustrated in FIG. 3, the web page 106 may contain the following JavaScript code that is executed immediately after the ad tag 120 is received by the web browser application 110, as shown at event 5:

end_timer ("top_center_tag");

At event 6, once the ad tag 120 has been received, the web browser application 110 may make a call to the media server 126 to obtain additional content 124 for the advertisement, such as a graphical image, based on the information contained in the ad tag. In one embodiment, this may be performed by setting a location attribute of an object in the web page 106, such as an "iframe" object, to the location of the additional content 124 specified in the ad tag 120. Alternatively, the call to the media server 126 may be performed through scripting code. Just as in the case with the call to the third-party advertisement service 122 described above, an operation timing 220 may be collected measuring the time of the call to the media server 126, as indicated by 306D, by first executing the following JavaScript code before setting the attribute of the markup tag:

start_timer ("top_center_ad");

At event 7, the media server 126 receives the request for the additional content 124 and returns the content to the web browser application 110 at event 8. Upon receiving the additional content 124, the web browser application 110 may mark completion of the call to the media server 126 as well as the operation of loading the advertisement on the page by executing the following JavaScript code:

end_timer ("top_center_ad");
end_timer ("top_center");

According to one embodiment, the code may be executed in an event generated by the web browser application 110 upon completion of the load of the additional content 124 from the media server 126, such as the "onload" event of the object in which the content was loaded. Finally, at event 9, upon completion of the rendering of the web page 106, the page may contain the following JavaScript code that marks the completion of the loading of the page:

end_timer ("page_load");

It will be appreciated that other operation timings 220, event counters 230, and other performance measurements may be collected during the rendering of the web page 106 beyond those described above and shown in FIG. 3. For example, multiple advertisements may appear in the web page 106, and operation timings 220 may be collected regarding the loading of each. In addition, the web page 106 may contain code that instructs the web browser application 110 to collect an event counter 230 counting each time a null ad is returned from the third-party advertisement service 122, as described above in regard to FIG. 2. The web browser application 110 may mark the reception of the null ad by calling another function in the API, such as:

increment_counter(id, incrementBy=1)

where id is the counter ID 232 for the corresponding event counter 230 and incrementBy is a parameter that tells the API the number of occurrences of the event to record. For example, the web page 106 may contain the following JavaScript code that is executed after receiving the null ad from the third-party advertisement service 122:

increment_counter ("nullad");

Once all the operation timings 220, event counters 230, and other performance measurements have been collected, the web browser application 110 may send an event report 130 containing the collected values to the reporting service module 132. This may be done automatically in the last pending end_timer call, for example, or it may be performed through additional scripting code embedded in the web page 106 or tied to a particular event that calls a function in the API, such as:

send_report ( )

In one embodiment, the event report 130 may be sent to the reporting service module 132 by the web browser application 110 through a hypertext transport protocol ("HTTP") GET call, with the values for the operation timings 220, event counters 230, and other performance measurements collected during rendering of the web page encoded in the address, or uniform resource locator ("URL"), for the call.

The page type 208 from the web page 106 may also be encoded in the URL for the call, along with the unique event report ID 202, timestamp 204, signature key 206 and any geolocation data 210 generated by the web server 104 and embedded in the web page before being initially sent to the web browser application 110. This may result in an URL for the HTTP GET call such as the following:

http://appsrv.serviceprovider.com/rptgsvcmod?id=
        a84b76633cdf773898fb6638acc77345542&
        key=d67360872e6d9ce756443d9f06d76bf2951&
        timestamp=2010-03-31T23%3A27%3A29GMT&
        pagetype=homepage&geo=US&
        operation.1=page_load&operationtiming.1=1790&
        operation.2=top_center&operationtiming.2=1070&
        operation.3=top_center_tag&operationtiming.3=485&
        operation.4=top_center_ad&operationtiming.3=585&
        counter.1=nullad&countercount.1=1

As will be described below in regard to FIG. 4, the reporting service module 132 executing on the application servers 134 may receive the HTTP GET call, extract the values for the event report 130 from the encoded URL, validate the values, and store the operation timings 220, event counters 230, and other performance measurements contained therein in the database 136. It will be appreciated that any other method known in the art may be utilized by the web browser application 110 to send the event report 130 to the reporting service module 132, including an HTTP POST call, a SOAP-based web service call, an Ajax call, and the like.

Figure 4:
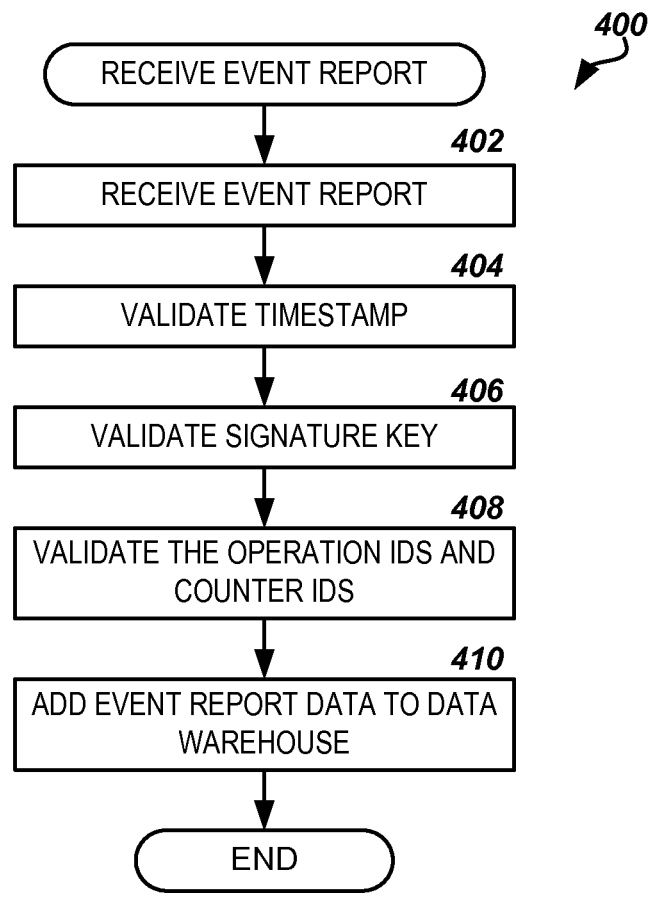
FIG. 4 is a flow diagram showing methods for receiving and validating an event report, according to embodiments described herein.

Turning now to FIG. 4, additional details will be provided regarding the embodiments presented herein for collecting client-side performance metrics and latencies. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for receiving and validating an event report 130, according to embodiments described herein. In one embodiment, the routine 400 is performed by the reporting service module 132. It will be appreciated that the routine 400 may also be performed by another module or component of the content provider system 102, or by a combination of modules and components.

The routine 400 begins at operation 402, where the reporting service module 132 receives the event report 130. For example, the event report 130 may be received in an HTTP GET call with the associated values encoded in the URL, as described above in regard to FIG. 3. The reporting service module 132 may then extract the values for the event report 130 from the URL, as necessary. From operation 402, the routine 400 proceeds to operation 404, where the reporting service module 132 validates the timestamp 204 contained in the event report 130. As described above in regard to FIG. 2, the timestamp 204 may indicate the approximate date and time that the web page 106 was rendered by the web browser application 110 on the user computing device 112. In one embodiment, if the timestamp 204 indicates that the values in the event report 130 are "stale," e.g. not collected in the last 15 minutes, the event report may be dropped and not added to the database 136.

The routine proceeds from operation 404 to operation 406, where the reporting service module 132 validates the signature key 206 contained in the event report 130. As further described above in regard to FIG. 2, the signature key 206 may contain an HMAC computed from the timestamp 204 and a secret code by the web server 104 before the web page 106 was sent to the user computing device 112. According to one embodiment, the reporting service module 132 re-computes the HMAC from the timestamp 204 in the event report 130 and the secret code used by the web server 104, and then compares the re-computed HMAC to the signature key 206 in the event report. If the values do not match, the event report 130 may not be authentic, and therefore may be dropped.

From operation 406, the routine 400 proceeds to operation 408, where the reporting service module 132 validates the operation IDs and counter IDs contained in the event report 130. Next, at operation 410, the reporting service module 132 adds the validated event report 130 to the database 136. As discussed above in regard to FIG. 2, multiple event reports 130 may be received during the rendering of the web page 106 by the web browser application 110. Each of the multiple event reports 130 will have the same unique event report ID 202, and the event reports may be consolidated into a single event report 130 in the database 136. From operation, 410, the routine 400 ends.

Figure 5:
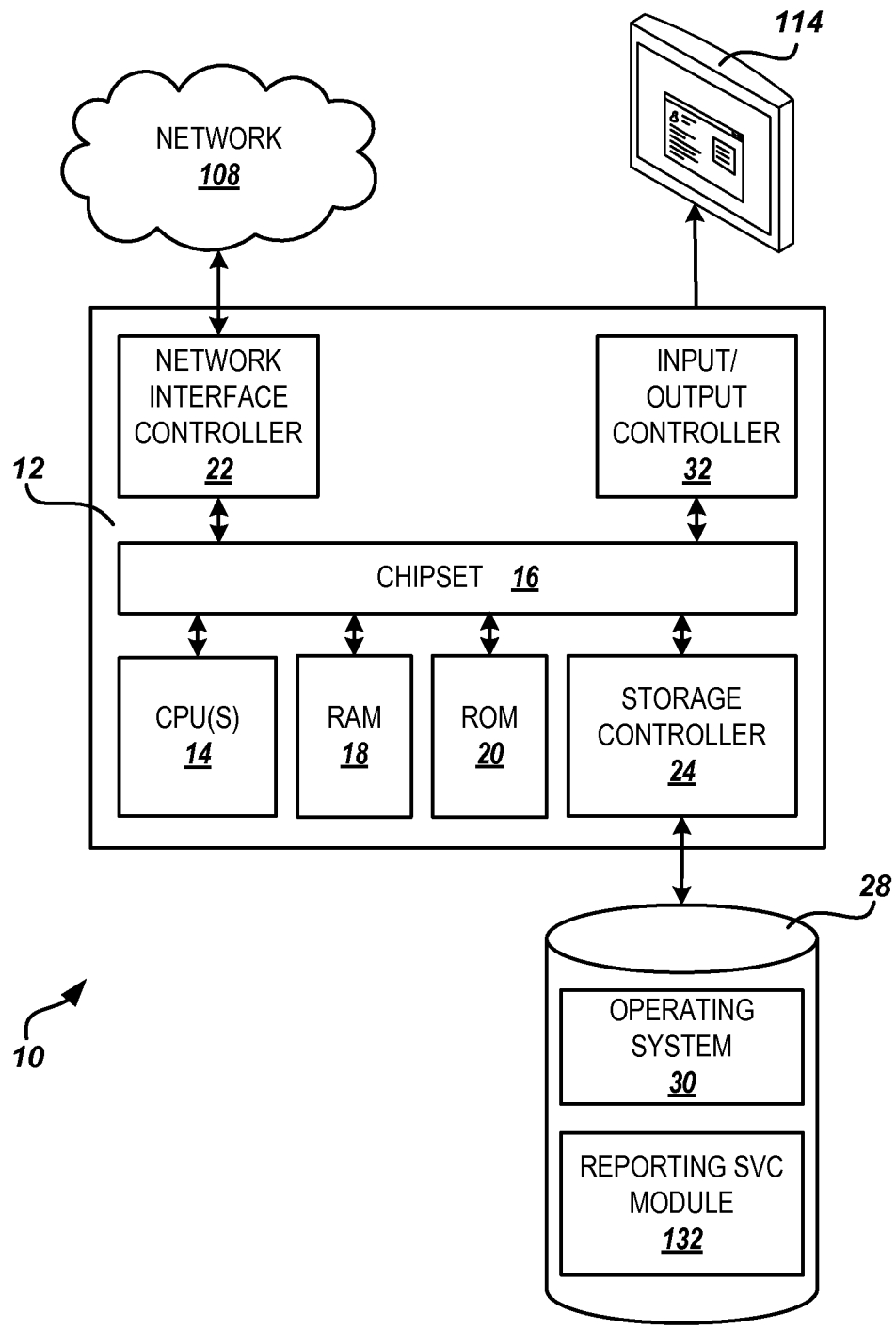
FIG. 5 is a computer architecture diagram showing an illustrative computer hardware architecture for computing devices described in embodiments presented herein.

FIG. 5 shows an example computer architecture 10 for a computer 12 capable of executing the software components described herein for collecting client-side performance metrics and latencies, in the manner presented above. The computer architecture 10 shown in FIG. 5 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing on the application servers 134, the user computing device 112, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through the network 108. The chipset 16 includes functionality for providing network connectivity through a network interface controller ("NIC") 22, such as a gigabit Ethernet adapter. The NIC 22 is capable of connecting the computer 12 to other computing devices over the network 108, such as the user computing device 112, the web server 104, other application servers 134 in the content provider system 102, and the like. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage units.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable storage medium to store and retrieve information, such as program modules, data structures, or other data. It should be appreciated by those skilled in the art that computer-readable storage media can be any available media that may be accessed by the computer 12. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized.

The mass storage device 28 may store other system or application programs and data utilized by the computer 12, such as the reporting service module 132 described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 400 for collecting client-side performance metrics and latencies, as described above in regard to FIG. 4.

The computer 12 may also include an input/output controller 32 for receiving and processing input from a number of input devices 34, such as a keyboard, a mouse, a touchpad, a touch screen, an electronic stylus, or other type of input device. Similarly, the input/output controller 32 may provide output to the display 114, such as a computer monitor, a flat-panel display, a digital projector, a printer, a plotter, or other type of output device. It will be appreciated that the computer 12 may not include all of the components shown in FIG. 5, may include other components that are not explicitly shown in FIG. 5, or may utilize an architecture completely different than that shown in FIG. 5.

Based on the foregoing, it should be appreciated that technologies for collecting client-side performance metrics and latencies are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising:
    receiving, at a computer system, a plurality of event reports from a client computing device, wherein the plurality of event reports identify a same report ID and comprise at least one event counter specifying a number of times that an identified event occurred during rendering of content by the client computing device;
    responsive to receiving the plurality of event reports, consolidating, by the computer system, the plurality of event reports identifying the same report ID into a single event report; and
    storing, by the computer system, the single event report in a database.

2. The computer-implemented method of claim 1, where the at least one event counter is collected by a client application executing on the client computing device according to scripting language code provided to the client computing device by the computer system in a markup file.

3. The computer-implemented method of claim 1, wherein the at least one event counter further specifies of a number of calls to external servers to retrieve additional content that returned no data.

4. The computer-implemented method of claim 1, wherein the plurality of events reports further comprises at least one operation timing specifying a duration of execution of an identified operation during the rendering of the content.

5. The computer-implemented method of claim 4, wherein the at least one operation timing comprises a specification of a duration of a call by the client computing device to an external server to retrieve additional content.

6. The computer-implemented method of claim 1, wherein each of the plurality of event reports comprises a timestamp indicating an approximate time of the rendering of the content at the client computing device.

7. The computer-implemented method of claim 1, wherein each of the plurality of event reports comprises a signature key utilized to validate the plurality of event reports before consolidating and storing.

8. The computer-implemented method of claim 1, wherein the plurality of event reports further comprises geolocation data regarding a location of the client computing device.

9. A non-transitory computer-readable storage medium having computer-executable instructions stored thereon that, when executed by a computer, cause the computer to:
    responsive to receiving a first event report from a client computing device, consolidate the first event report with other event reports received from the client computing device that include a same event report ID to thereby form a consolidated event report, wherein the first event report comprises the event report ID and one or more performance measures collected during rendering of content via the client computing device, and wherein the one or more performance measures are collected by an application executing on the client computing device according to scripting language code provided to the client computing device in a markup file; and
    store the consolidated event report in a data storage system.

10. The non-transitory computer-readable storage medium of claim 9, wherein the one or more performance measures in the first event report comprises an operation timing specifying a duration of execution of an identified operation during the rendering of the content.

11. The non-transitory computer-readable storage medium of claim 10, wherein the operation timing comprises a specification of the duration of a call by the client computing device to an external server to retrieve additional content to render.

12. The non-transitory computer-readable storage medium of claim 9, wherein the one or more performance measures in the first event report comprises an event counter specifying a number of times that an identified event occurred during the rendering of the content.

13. The non-transitory computer-readable storage medium of claim 12, wherein the event counter comprises the specification of a number of calls to external servers to retrieve additional content that returned no data.

14. The non-transitory computer-readable storage medium of claim 9, wherein the first event report further comprises a signature key computed from a unique value contained in the event report, and wherein the computer-readable storage medium has further computer-executable instructions stored thereon that cause the computer to validate the first event report based on the signature key.

15. The non-transitory computer-readable storage medium of claim 14, wherein the first event report further comprises a timestamp indicating an approximate time of the rendering of the content at the client computing device, and wherein validating the first event report further comprises verifying that the first event report contains recently collected performance measures based on the timestamp.

16. The non-transitory computer-readable storage medium of claim 9, wherein the first event report comprises geolocation data regarding a location of the client computing device.

17. The non-transitory computer-readable storage medium of claim 9, wherein the first event report is sent by the application executing on the client computing device at a point relative to a critical period in the rendering of the content and before the rendering of the content is completed.

18. The non-transitory computer-readable storage medium of claim 17, wherein the first event report includes all performance measures collected by the application executing on the client computing device during the rendering of the content prior to the point relative to the critical period.

19. The non-transitory computer-readable storage medium of claim 9, wherein the content is rendered to a display connected to the client computing device.

20. A system comprising:
a first server configured to transmit a web page to a web browsing application executing on a client computing device, the web page comprising instructions that cause the web browsing application to collect performance measures during rendering of content by the client computing device; and
a reporting service module executing on a second server operably connected to the client computing device and configured to
receive an event report from the client computing device, wherein the event report comprises an event report ID and at least one event counter specifying a number of times that an identified event occurred during the rendering of the content,
responsive to receiving the event report, validate the event report by verifying a value of a signature key contained in the event report, and
responsive to validating the event report, store the event report in a data storage system.

21. The system of claim 20, wherein the event report further comprises at least one operation timing specifying a duration of execution of an identified operation during the rendering of the content.

22. The system of claim 20, wherein the event report further comprises geolocation data regarding a location of the client computing device.

23. The system of claim 20, wherein the first server and the second server comprise a same server.

24. A computer-implemented method comprising:
sending, by a computer system, a markup file to a client computing device, the markup file comprising instructions that cause a client application executing on the client computing device to collect client-side performance measures during rendering of content by the client computing device;
receiving, at the computer system, a first event report from the client computing device, wherein the first event report comprises an event report ID and at least one event counter specifying a number of times that an identified event occurred during the rendering of the content; and
storing, by the computer system, the first event report in a data storage system.

25. The computer-implemented method of claim 24, wherein the first event report further comprises at least one operation timing specifying a duration of execution of an identified operation during the rendering of the content.

26. The computer-implemented method of claim 24, wherein the first event report further comprises a signature key, the method further comprising validating, by the computer system, the first event report based on the signature key.

27. The computer-implemented method of claim 24, further comprising:
receiving, at the computer system, a second event report from the client computing device, wherein the second event report comprises a same event report ID as the first event report; and
consolidating, by the computer system, the first event report and the second event report comprising the same event report ID in a single event report before storing the single event report in the data storage system.

* * * * *